United States Patent [19]

Tomson et al.

[11] 4,207,931
[45] Jun. 17, 1980

[54] METHODS AND APPARATUS FOR DISPENSING DYNAMOELECTRIC MACHINE LUBRICANT MATERIAL

[75] Inventors: James M. Tomson, Fort Wayne; Richard C. Bohde, New Haven, both of Ind.

[73] Assignee: General Electric Company, Fort Wayne, Ind.

[21] Appl. No.: 946,569

[22] Filed: Sep. 28, 1978

[51] Int. Cl.² ........................... B65B 3/04; B65B 3/10
[52] U.S. Cl. ........................................ 141/1; 141/258
[58] Field of Search ......... 141/1, 2, 18, 125, 183–191, 141/250–284, 301, 302, 98

[56] References Cited

U.S. PATENT DOCUMENTS

| | | |
|---|---|---|
| 2,966,459 | 12/1960 | Abel . |
| 3,053,421 | 9/1962 | Abel . |
| 3,221,948 | 12/1965 | Kalist . |
| 3,226,801 | 1/1966 | Abel . |
| 3,268,638 | 8/1966 | Tann . |
| 3,466,244 | 9/1969 | Abel . |
| 3,765,575 | 10/1973 | Abel . |
| 3,774,721 | 11/1973 | Hollewell . |

Primary Examiner—Houston S. Bell, Jr.
Attorney, Agent, or Firm—Ralph E. Krisher, Jr.

[57] ABSTRACT

This application discloses methods and apparatus particularly useful for repetitively charging consistently accurate quantity charges of a lubricant retaining and wicking material to bearing lubricant reservoirs of dynamoelectric machines. A metering head is movably supported on a base for motion toward and away from a bearing and its support while both are held in alignment with the metering head. The metering head includes chamber means in the form of one or more dispensing chambers which may be sealingly coupled to the bearing support structure. The chamber means receives lubricant retaining material through a given port from a source with excess material returning to the source. A valving arrangement interrupts the supply of material without substantially changing either the volume or pressure of the material in the dispensing chamber. An evacuation passage material flow path from the same given port of the chamber to the bearing support structure or other workpiece is established and the material is extruded from the chamber through the same port. One preferred method includes supplying a compressible mixture of lubricant and wicking material to a chamber under consistent conditions, and moving the material into the chamber linearly, i.e., without substantially changing the flow path of the material after it passes the inlet port.

12 Claims, 26 Drawing Figures

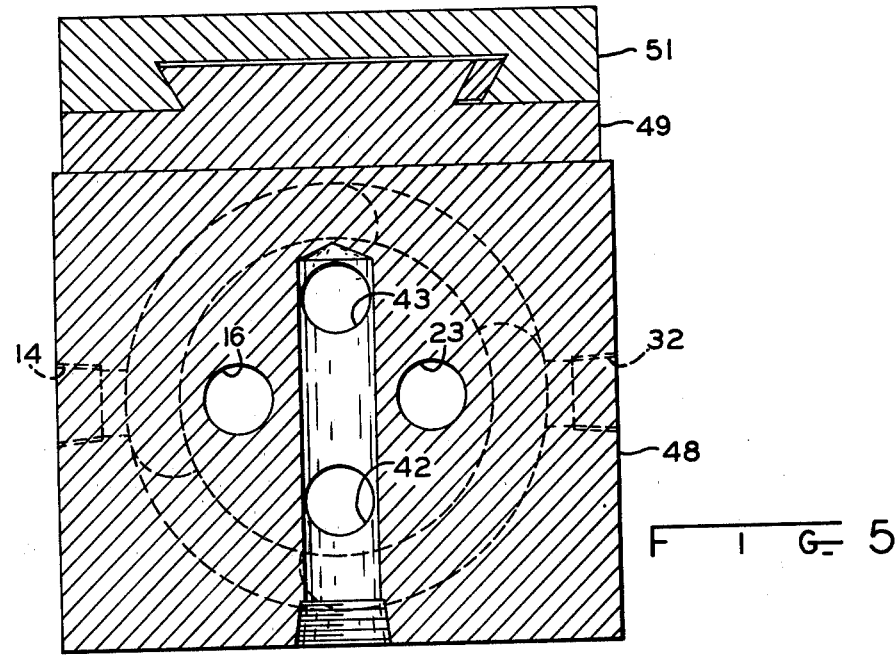
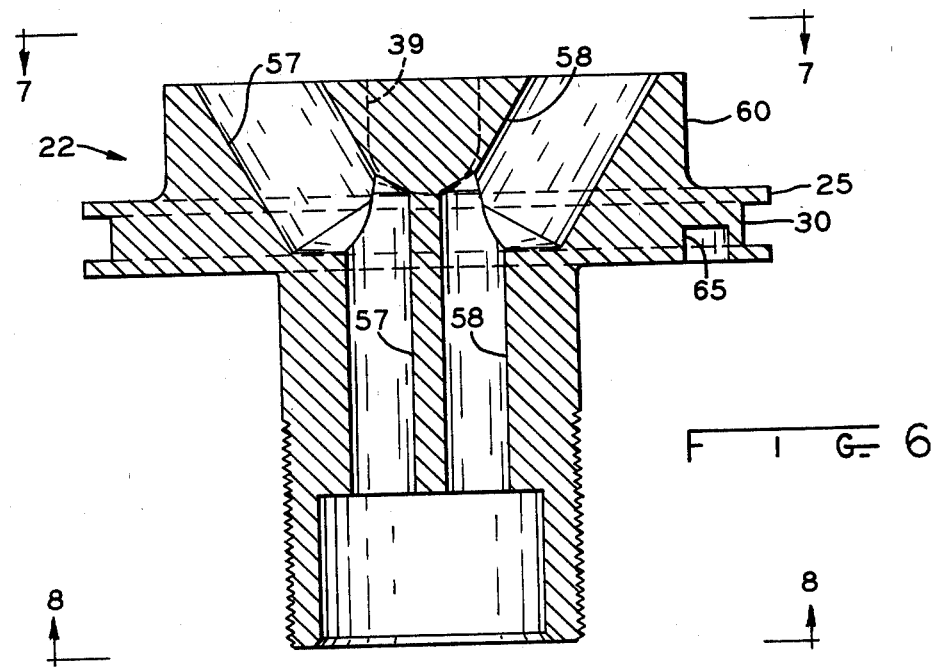

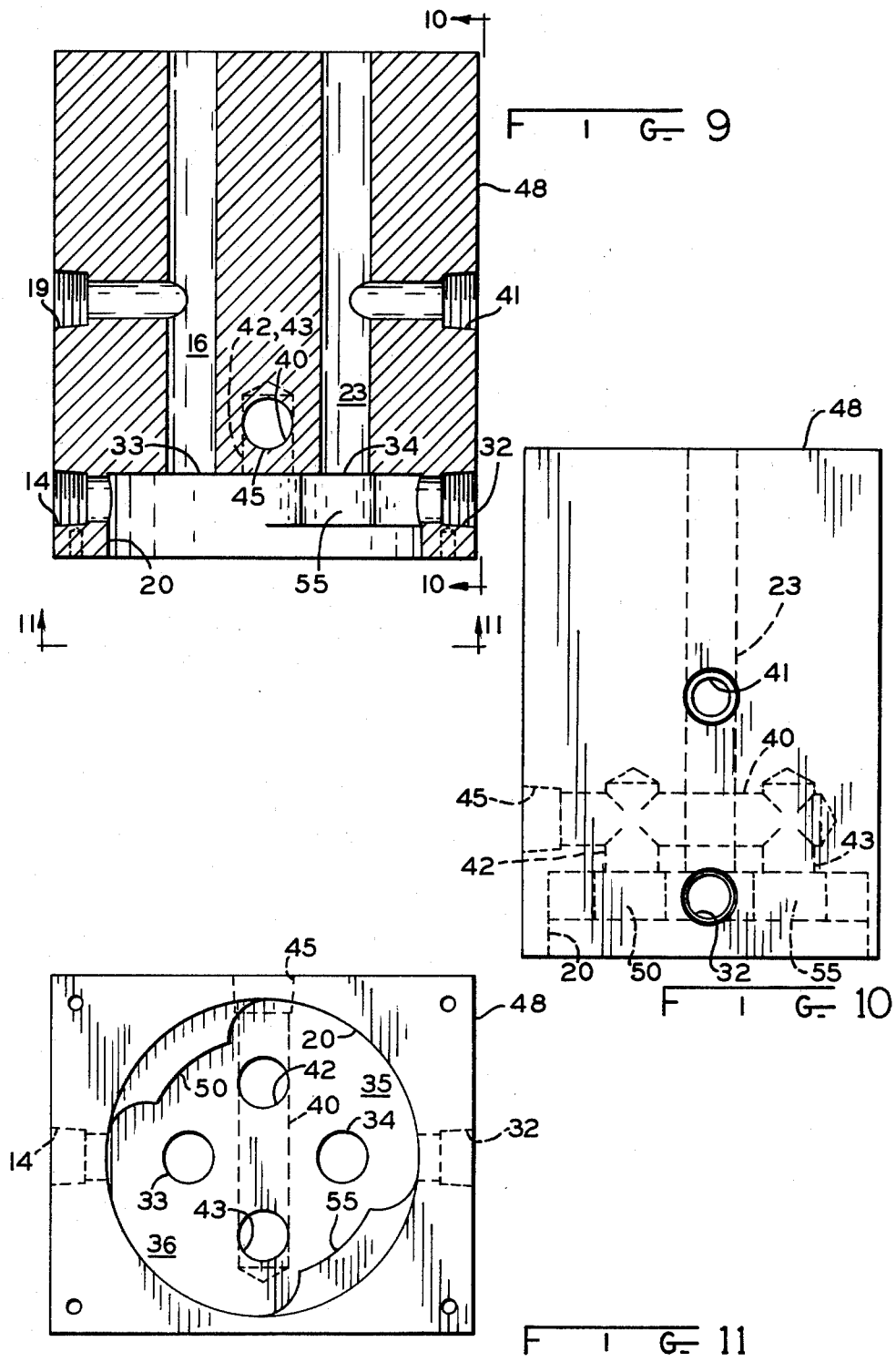

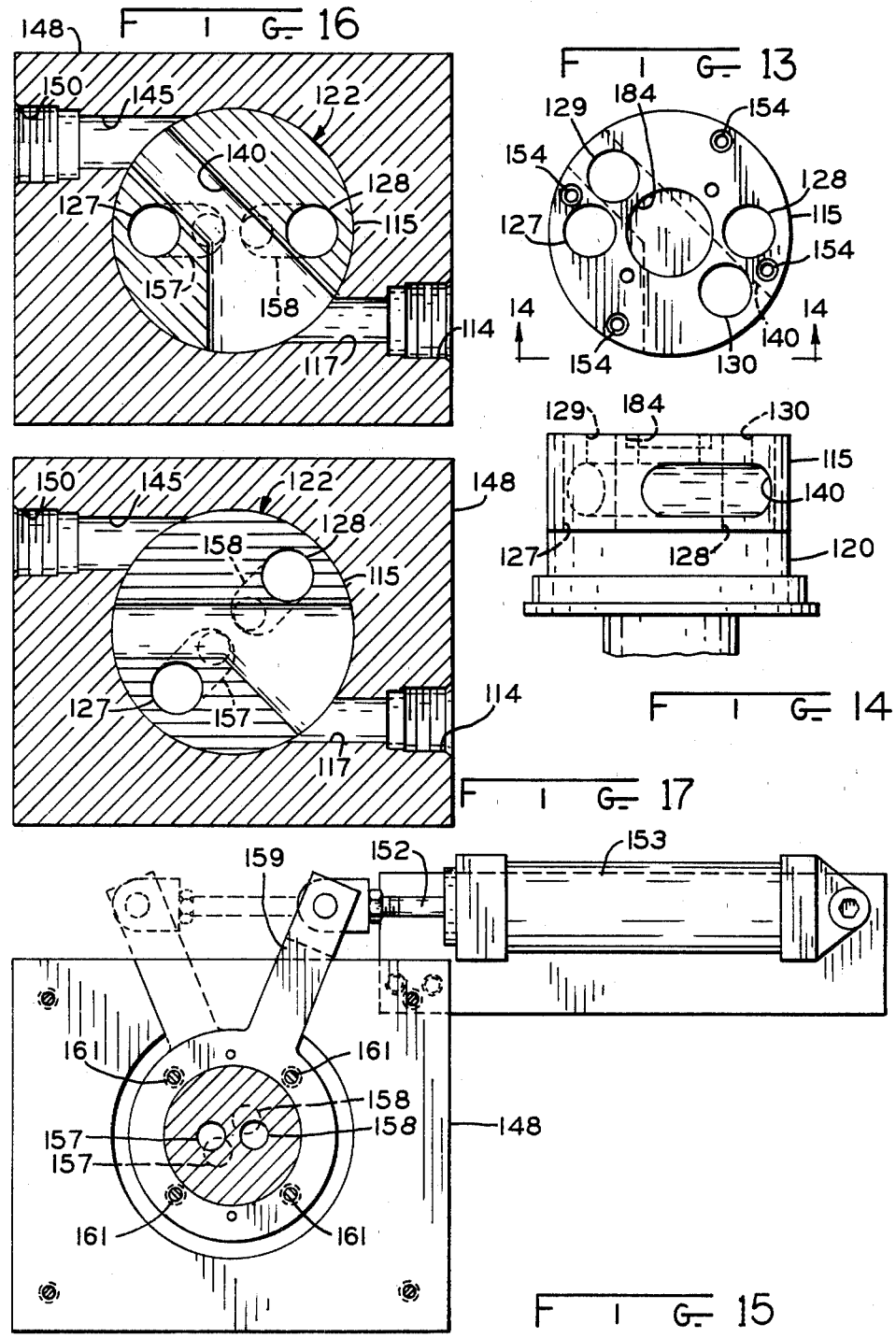

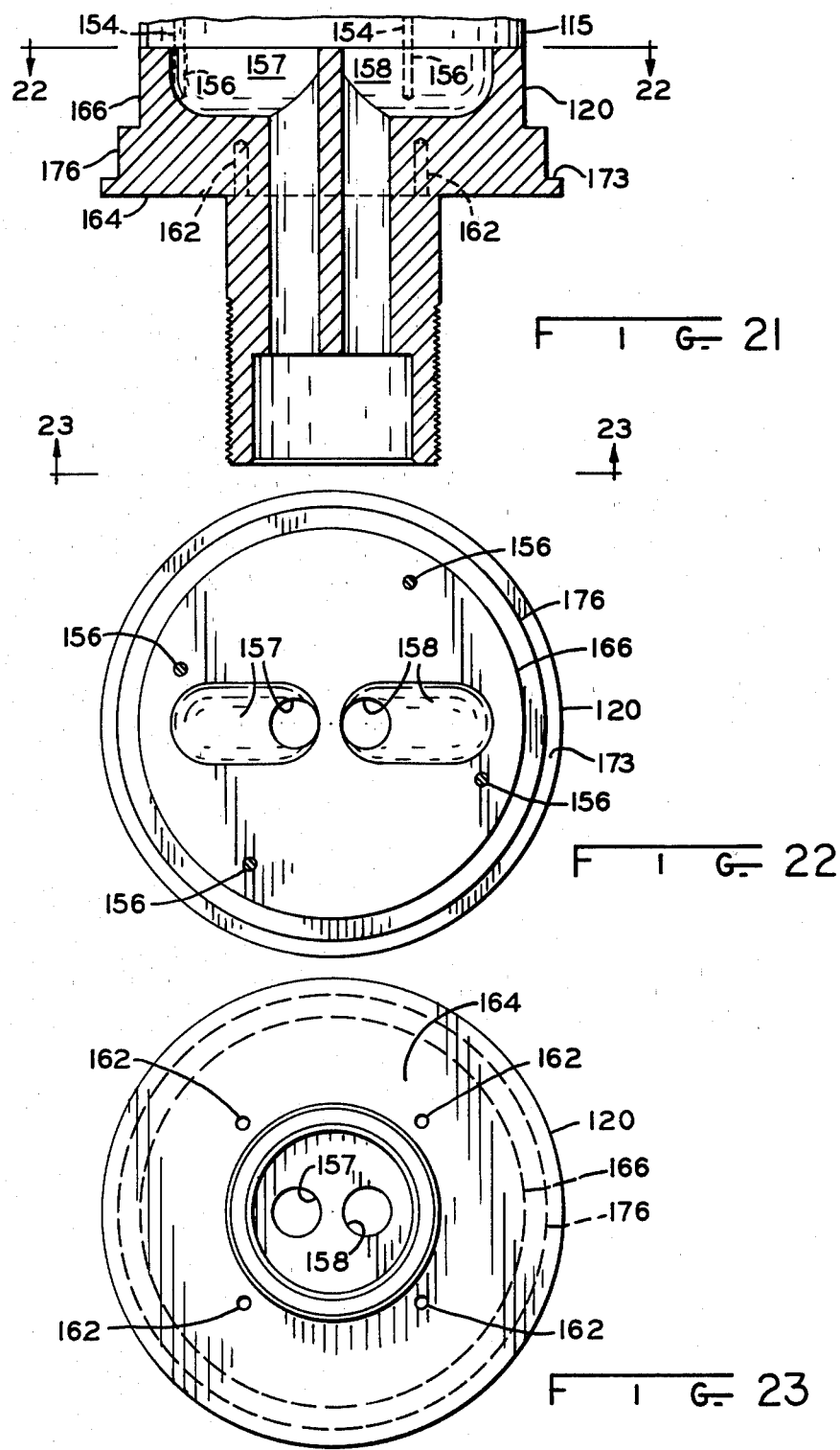

METHODS AND APPARATUS FOR DISPENSING DYNAMOELECTRIC MACHINE LUBRICANT MATERIAL

CROSS REFERENCE TO RELATED APPLICATIONS

This application is generally related to the same subject as co-pending application Ser. Nos. 946,553 and 946,554, both of which were filed on the same day as this application, are commonly assigned herewith, and filed respectively in the name of Larry W. Stoner, and in the names of James M. Tomson and Richard C. Bohde. The disclosures of these related applications are hereby incorporated by reference.

BACKGROUND OF THE INVENTION

The present invention relates generally to methods and apparatus for charging lubricant retaining and wicking material in consistent amounts, even when such material is readily compressible, into bearing lubricant reservoirs-including for example, bearing reservoirs of fractional horsepower motors.

In many material handling and moving applications, materials that are readily compressible or damaged are typically dispensed or metered by weight. On the other hand, materials that are pressurized and dispensed on a volume basis are either: (1) generally incompressible; (2) not adversely affected by pressurization or compression if they are in fact compressible; or (3) of a type such that non-consistent volumetric charges caused by compressive dispensing processes, are tolerable.

One specific area of technology in which the compressiblity of a weight or volumetrically dispensed material is significant is that which involves dispensing compressible lubricant storage materials into bearing lubricant reservoirs for small electric motors or generators. In this type of application, small quantities of material are charged into the bearing lubricant reservoir, and excess material quickly causes problems-both during and after motor assembly. For example, excess material can cause problems ranging from those associated with cleaning up excess material at the dispensing station or subsequent motor assembly stations, to those associated with excess oil dripping from a finally assembled motor, or flowing into the motor interior. As will be understood, these conditions are unacceptable from handling and appearance standpoints and also because future leakage paths for oil from the reservoir may be established.

In the above-mentioned specific area of technology, the materials that may be satisfactorily used for the application are rather limited in number. This is explained in more detail hereinafter, but for the present it is noted that the material must be such that it satisfies motor lubricant lubricating characteristics, that a sufficient amount of oil is released at acceptable flow rates for an acceptable period of time, and so that the oil does not inadvertently drip out of the motor. Moreover, the materials known to applicant as acceptable for this type of application can easily be deleteriously affected as a result of mishandling during a compressive dispensing process.

Exemplary specific examples of extrudable or flowable lubricating materials particularly adapted for fractional horsepower motor use are those that are made according to the commonly assigned Whitt U.S. Pat. No. 3,894,956 dated July 15, 1975; and those made pursuant to Abel U.S. Pat. No. 2,966,459 of Dec. 27, 1960, the entire disclosures of which are incorporated herein by reference. These lubricating materials (also sometimes referred to as wicking materials) include a lubricant mixed with a lubricant retaining material-such material being referred to herein as a carrier or matrix material. Numerous problems arise in dispensing lubricating materials of this type because squeezing the material can cause the lubricant to flow out of the matrix. In fact, settling or separation of the oil from the carrier or matrix usually ocurs with time simply due to bulk storage under static conditions.

The prior art recognizes and documents oil and matrix separation (as well as other metering problems) that occur when delivering this type of material to a metering or dispensing mechanism, and that also occur as the result of operation of the dispensing mechanism itself.

For example, Abel U.S. Pat. No. 3,053,421 (of Sept. 11, 1962) points out that variations in pressure exerted on extrudable wicking or lubricating materials can cause variations in "the ratio of the lubricating oil to the wicking material". Abel then goes on to describe by-pass or pressure relief valves and by-pass conduits, and a free piston metering device as important aspects of solving the separation problem. As another example, Tann U.S. Pat. No. 3,268,638 (of Aug. 23, 1966) stresses the separation problems associated with lubricant compositions of the type contemplated herein; and Tann suggests the use of vibratory techniques because of this problem.

The just-mentioned Tann patent illustrates what Tann describes as a metering and injection device wherein a pair of pistons are movable along a common bore. Material trapped between the two pistons is then dispensed into a lubricant reservoir or a bearing. The Tann arrangement, in addition to being one where the lubricantflow is not continuous (i.e., the flow is interrupted during each dispensing step); also provides for relative movement between the two pistons (which tends to separate the pistons) during a "retraction" stroke, with an injection or upper piston moving away from a lower or "metering head" piston. This relative movement in turn would appear to cause the creation of air pockets or voids between the co-acting end faces of the two pistons, or a suction which would tend to withdraw lubricant material in a reverse flow direction along a passage along the piston which forms the dispensing head or nozzle.

U.S. Pat. No. 3,221,948 to Kalist illustrates yet another structure wherein opposed movable pistons in a common bore are used to meter and dispense lubricating material. The structural elements used by Kalist are very similar to those of Tann, but the mode of operation of the Kalist structure is somewhat different from the Tann structure (discussed hereinabove). For example, with the Kalist approach, after a metered amount of lubricant has been dispensed, a lower piston associated with a dispensing head is moved in a "retracting" direction, and an upper piston is then moved in response to the movement of the lower piston. However, depending on which particular structure shown by Kalist is to be used (and in any event whenever the quantity of material actually dispensed is less than the maximum amount that could be dispensed) relative axial movement of the Kalist pistons will also occur. This relative movement with the Kalist structure is distinguished from the relative movement of Tann, in that the Kalist pistons tend to move toward one another and thus compress material trapped therebetween as the metering device retracts after material has been dispensed. This, in turn, can tend to cause oil per se or an oil-wicking mixture to exude from the metering head. This exuding material would be excess material that would cause the various problems mentioned hereinabove. In addition, any oil per se being exuded from the Kalist structure would alter the ratio of oil to matrix remaining in the Kalist structure.

At least the approach illustrated by Kalist has been utilized commercially long prior to the present invention and more than one year prior to this application. That commercially available equipment has included one or more cylinders having a pair of spaced apart movable pistons therein, and the separation between adjacent piston ends defines a volume intended to be substantially the same as the volume of a lubricant reservoir into which material is to be dispensed. The equipment under discussion also apparently follows the Kalist approach by using inlet and overflow ports in the cylinder side wall so that material may be supplied to a region between the two pistons through the inlet port and pass from such region through the outlet or overflow port. Thus, a substantially continuous circulation of material is maintained to assist in avoiding oil separation. In this equipment (as in the Kalist patent), the material is transferred from the metering head to a workpiece by moving an upper piston so as to close off the overflow outlet, close the inlet port, and isolate a charge of material between the two pistons. Continued movement of the first piston compressively moves the oil/matrix material which in turn forces the lower piston to move until the lower piston exposes an outlet port. Thereupon the lower piston ceases movement, and continued movement of the first piston forces the charge of material through the outlet port to the workpiece.

Since the prior art mechanisms discussed above rely solely on axial motion for valving as well as injecting forces, and due to the inherent design of such mechanisms, the dispensing of material at inappropriate times in the form of material dribbling from the injection head can occur, resulting in a messy and wasteful operation, and potential departure from the desired proper oil to matrix ratio.

It should now be understood that it would be desirable to provide new and improved methods of metering extrudable lubricants, and apparatus useful in practicing such methods; so that precisely controlled amounts of such material may be metered, so that unwanted exudates may be minimized or eliminated, and so that unwanted separation of a lubricant and lubricant carrier is minimized, if not eliminated. While the methods and apparatus described in the above referenced Stoner application would seem to overcome many of the problems discussed hereinabove, it would also be desirable to provide an improved metering head that would overcome the above problems and yet be virtually interchangeable with metering heads of the commercially available equipment described hereinabove.

It also would be desirable to reduce the number of parts utilized by the approach of Stoner and to provide a metering head design that may be produced more economically without loss of the advantageous features of Stoner.

In both the Stoner and prior approaches described hereinabove, relatively large masses must be moved in order to effect valving sequences, and material flowing from supply conduits into metering chambers does not flow linearly. In other words, the material is subjected to a relatively abrupt change in direction of flow, and this may be objectionable with some materials being handled because at least a tendency for separation of oil and matrix may be induced thereby. Thus, the desirability of reducing movable masses (which can reduce cost and also alleviate seal problems) and maintaining generally linear or collinear flow of material into and out of metering cavities should be apparent.

In the other approaches of which we are aware, retraction of a nozzle from an end frame is accomplished by simple axial movement relative to the end frame. This movement applies tension to any column of lubricant or wicking material that extends unbroken from inside the discharge nozzle to the inside of the end frame oil reservoir. Such tension, in turn, tends to "pull out" excess material from the nozzle (which can cause messy or "over fill" conditions; or tends to "pull out" material from the lubricant reservoir. When the latter occurs, a "short fill" condition may result and, additionally, the excess wicking material hanging on the nozzle typically will drop away and contribute to housekeeping problems at the work station. Thus, it would be desirable to provide simple and automatic methods and apparatus that alleviate the tension induced material "pull out" problems just discussed. Moreover, it would be desirable to eliminate specific structure parts utilized with the Stoner approach, as will become apparent as the present description ensues.

SUMMARY OF THE INVENTION

Accordingly, it is a general object of the present invention to provide new and improved methods and apparatus for metering and extruding lubricant materials whereby the difficulties and problems associated with other approaches in the art are overcome.

A more specific object of the present invention is to provide new and improved methods and apparatus for dispensing extrudable lubricants whereby a material flow path is closed or interrupted at the end of a metering or dispensing procedure without the closing or interrupting procedure itself introducing a pressure gradient across material in the metering system and whereby nonlinear flow of material into and out of a dispensing cavity is effected.

A more specific object of the present invention is to provide new and improved methods and apparatus for compressively extruding lubricant material from a metering device and for isolating the source of the material from discharge paths until the discharge paths have been completely closed at the conclusion of a metered discharge step, and separating a discharge nozzle from a material receiver without pulling material out of the nozzle or receiver.

Yet another object of the present invention is to provide new and improved methods and apparatus whereby a metering head discharge nozzle is moved axially toward and away from a lubricant reservoir defining structure without inducing a pressure gradient across extrudable lubricant retained in the metering head and wherein relative rotary movement of the reservoir and nozzle to overcome pull out problems is provided so that the material at the interface of the nozzle and end frame is separated by a shearing action.

Still other objects of the present invention include the provision of dispensing methods and apparatus characterized by reliability, consistency of results, and even further reduction of dispensed material waste; the provision of a material dispensing method wherein flow control techniques are essentially independent of the means utilized for expelling material from a chamber and linear flow of material vis-a-vis the chamber is accomplished; and the provision of improved dispensing methods and apparatus wherein control of the flow of material from a source, and movement of a dispenser to and from a dispensing position is an isobaric process vis-a-vis material in a metering chamber.

In carrying out the above and other objects of the invention, in one preferred form thereof, we provide a method of dispensing measured charges of a compressible lubricant composition to a lubricant reservoir of a motor by supplying the composition, under pressure, essentially linearly into a dispensing chamber to fill the chamber with material. We then stop the flow of material into the dispensing chamber inlet while maintaining the pressure but preferably without increasing the pressure on the material in the chamber, and maintain the mass of material within the volume defined by the chamber substantially constant. At the time we stop the material flow to the chamber, we also preferably change the condition of an overflow outlet, and establish a material dispensing outlet from the chamber without affecting the pressure in the chamber. In other words, we maintain an isobaric condition in the chamber while stopping the flow of material into the dispensing chamber. Thereafter, we compressively urge material from the chamber through a dispensing outlet and to the workpiece along a path that is substantially collinear with the path taken by the material as it was moved into the chamber. When an excess material overflow outlet from the chamber to the material supply source is employed, material may be supplied to the chamber continuously after it is filled. Closing of the excess material overflow outlet after the chamber is filled isolates a charge of material in the chamber and in the preferred method, the volume defined by the chamber cavity is maintained constant during closure of the overflow port.

Alternatively, movement of the dispensing pistons may be used as the sole means for closing the excess material overflow ports (in the same manner as shown in Kalist or the prior commercial equipment discussed hereinabove). In that event, closure of the excess material overflow ports will be accompanied by application of pressure to material in the cavity, but this is not unduly objectionable.

After a charge has been dispensed, the chamber inlet is reconnected to the material source, and this reconnecting action is accompanied by a wiping action of a dispensing nozzle so as to shear the material at the interface of the nozzle and a bearing supporting structure. Material then again preferably is supplied linearly through the inlet, causing a chamber piston to move toward an overflow port. As the chamber attains a refilled condition, the piston passes by and exposes the overflow outlet or port, and the chamber is then ready for a subsequent dispensing operation. A plurality of bearing lubricant cavities may be supported during the preferred process with one of the cavities positioned to receive dispensed material. Then, during the chamber refilling process, the supported and filled cavity may be moved away, and a different supported cavity moved into position to receive oil storage material.

In one form of an embodiment of the invention, a material metering device for repetitively dispensing consistent quantity charges of a compressible lubricating material to a series of end shield supported dynamoelectric machine bearings includes a device which includes a metering or injection head that may replace a head on other commercially available equipment, and an arrangement for relatively axially moving the metering head and an end shield so as to mate the nozzle portion of the metering head with an axially aligned supported end shield in a material transfer relation. The device also includes means for periodically moving end shields toward and away from the metering head. Material is preferably supplied from a material source to the chamber in a recirculating manner, and overflow material from the chamber is returned to the material source. The material supply into the chamber itself is interrupted just prior to a material dispensing operating without substantially changing the volume of, or the pressure on, the material in the chamber. Preferably, such interruption occurs without moving the chamber toward the end shield. In the most preferred forms, rotary means are utilized in conjunction with an axially movable dispensing mechanism. When this mechanism includes a reciprocating piston, the rotary valving operation is operable independently of piston reciprocation.

The rotary means include a structural arrangement that permits relative rotary movement between one or more metering chambers and means that selectively establish a discharge path for the chamber or a path for the flow of material from the supply source into the chamber. In preferred forms, structural arrangements embodying the invention are operative to selectively block the flow of material into the chamber from the material supply, and establish a discharge path for metered material from the chamber into a bearing lubricant reservoir. Then, after metering or injection of the material, the discharge path is disconnected from open communication with the chamber, and the flow of material from the material supply into the metering chamber is re-established. More specifically, improved arrangements embodying our invention utilize the motions required for selectively blocking material flow and disconnection of the discharge path to also effect a rotary wiping and material shearing action at the interface of the dispensing mechanism and bearing lubricant reservoir. In the most preferred embodiments of the invention, the same mechanism that effects valving sequences of the apparatus also effects the rotary wiping and material shearing action.

The subject matter which is regarded as our invention is particularly pointed out and distinctly claimed in the concluding portion of this specification. The invention itself, however, together with further objects and advantages thereof, may be best understood by reference to the following description taken in conjunction with the accompanying drawings wherein like reference numerals have been utilized to denote like parts.

BRIEF DESCRIPTION OF THE DRAWINGS

FIG. 5 is a view along section line 5—5 of FIG. 1;

FIG. 6 is an elevation, with parts in section, of part of the apparatus shown in FIG. 1;

FIG. 9 is an elevation view, with parts broken away and parts in section, of a portion of the apparatus shown in FIG. 1;

FIG. 10 is a view taken in the direction of lines 10—10 in FIG. 9, assuming the structure of FIG. 9 to be shown in full;

FIG. 11 is a view similar to FIG. 10, but taken in the direction of lines 11—11 in FIG. 9;

FIG. 13 is a top view of part of a valving mechanism used in the apparatus of FIG. 12;

FIG. 14 is a view taken in the direction of lines 14—14 in FIG. 13;

FIG. 15 is a view taken in the direction of lines 15—15 in FIG. 12;

FIGS. 16 and 17 are views taken in the direction of lines 16—16 in FIG. 12, but showing valving means in two different positions relative to a metering block;

FIG. 21 is a view of a portion of a valve means;

FIG. 22 is a view taken in the direction of lines 22—22 in FIG. 21;

FIG. 23 is a view taken in the direction of lines 23—23 in FIG. 21;

DESCRIPTION OF THE PREFERRED EMBODIMENTS

Figure 1:
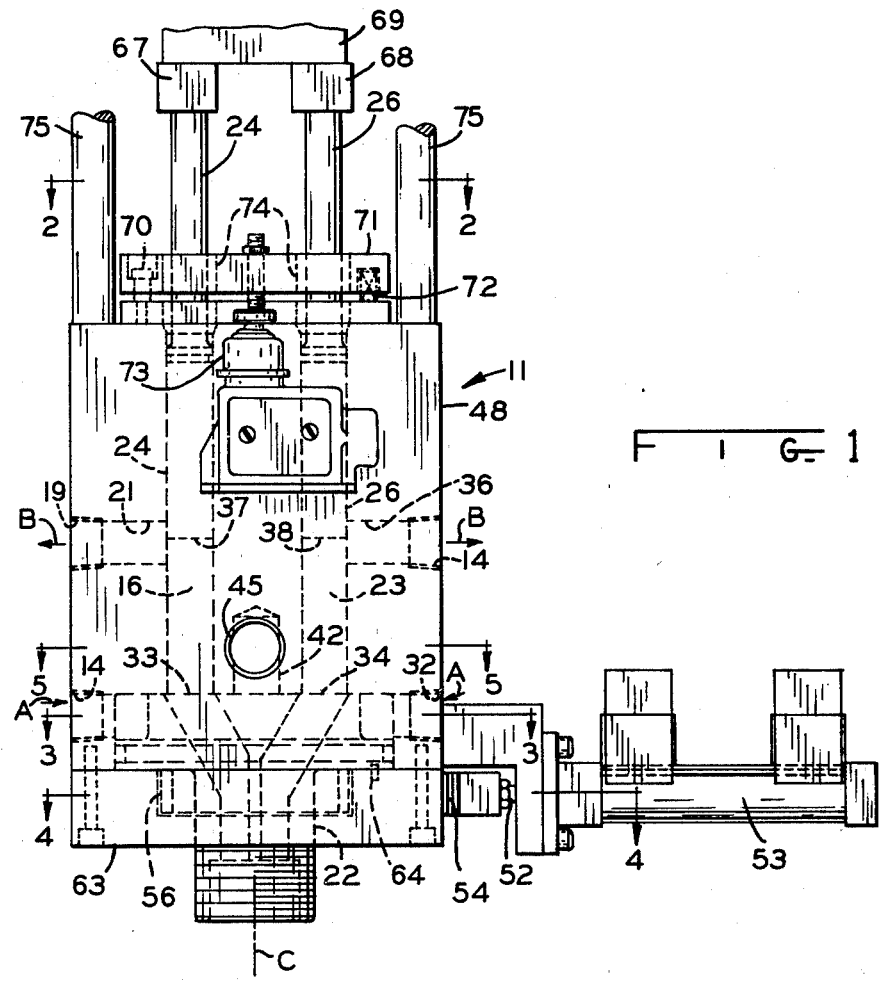
FIG. 1 is a front elevation, with parts removed and parts broken away, of apparatus embodying one form of the invention and that may be used to practice the invention in one preferred form.
Figure 2:
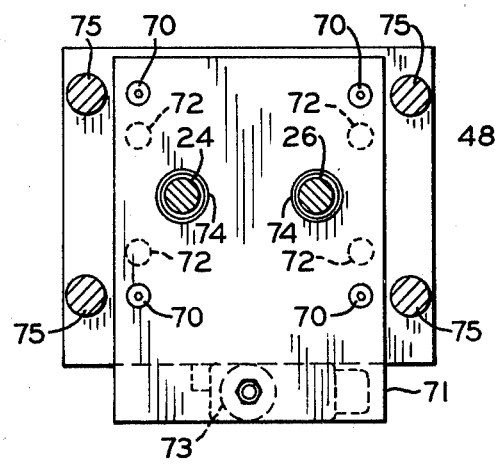
FIG. 2 is a view, with parts removed, taken along the section line 2-2 of FIG. 1.

With general reference now to the drawings, a method is provided in one form of the invention that includes dispensing measured charges of material into a bearing lubricant reservoir of, for example, a fractional horsepower motor. Preferred methods may be practiced with the apparatus of FIG. 1 or FIG. 12. To a major extent, the following description will refer to the apparatus of both figures. However, to avoid confusion, parenthetical reference will be supplied for the apparatus of FIG. 12, and parts thereof shown in more detail in FIGS. 13—23. Material is supplied to apparatus 11 (apparatus 111 in FIG. 12) through the inlet 14 (114 in FIG. 12) and into a dispensing chamber 16 (116 in FIG. 12) by means of a not shown conduit and a material admitting passage 17 (117 in FIG. 12).

The conduit in turn is connected to an appropriate source of material. Such source may be the transmission and pump of equipment such as that shown in FIG. 3 of Abel U.S. Pat. No. 3,053,421; or a pump as disclosed in the commonly assigned co-pending application Ser. No. 946,554 which was filed on the same day as this application in the names of James M. Tomson and Richard C. Bohde, and entitled "Lubricant Transmission Pump". The entire disclosures of the just-mentioned Abel patent and Tomson et al application are specifically incorporated herein by reference.

A material overflow or outlet port 19 (119 in FIG. 12) is also provided which returns material to the supply source from discharge passage 21 (121 in FIG. 12) to any suitable discharge conduit. Thus, material may be continually supplied to the chamber 16 as indicated by arrow A (chamber 116 and arrow 1A in FIG. 12) and recirculated as indicated by arrow B (arrow 1B in FIG. 12) to the supply-provided that the circulation path through the chamber 16 (116 in FIG. 12) is not obstructed and that the inlet and outlet ports are not closed. This type of arrangement can be of advantage for reasons now known in the art-i.e., to prevent separation of oil and matrix material while the apparatus 11 is idle.

The material outlet port 19 (119) and inlet port 14 (114) may be substantially simultaneously controlled by rotary action valve means that cut across the flow path of the material. This is accomplished by relatively moving the ports, and valve means that are illustrated herein as body 22 in FIGS. 1 and 6-8 [composite body 122 in FIG. 12, comprised of top disc 115 (see FIGS. 13 and 14) and lower section 120 (see FIGS. 21-23)].

Figure 12:
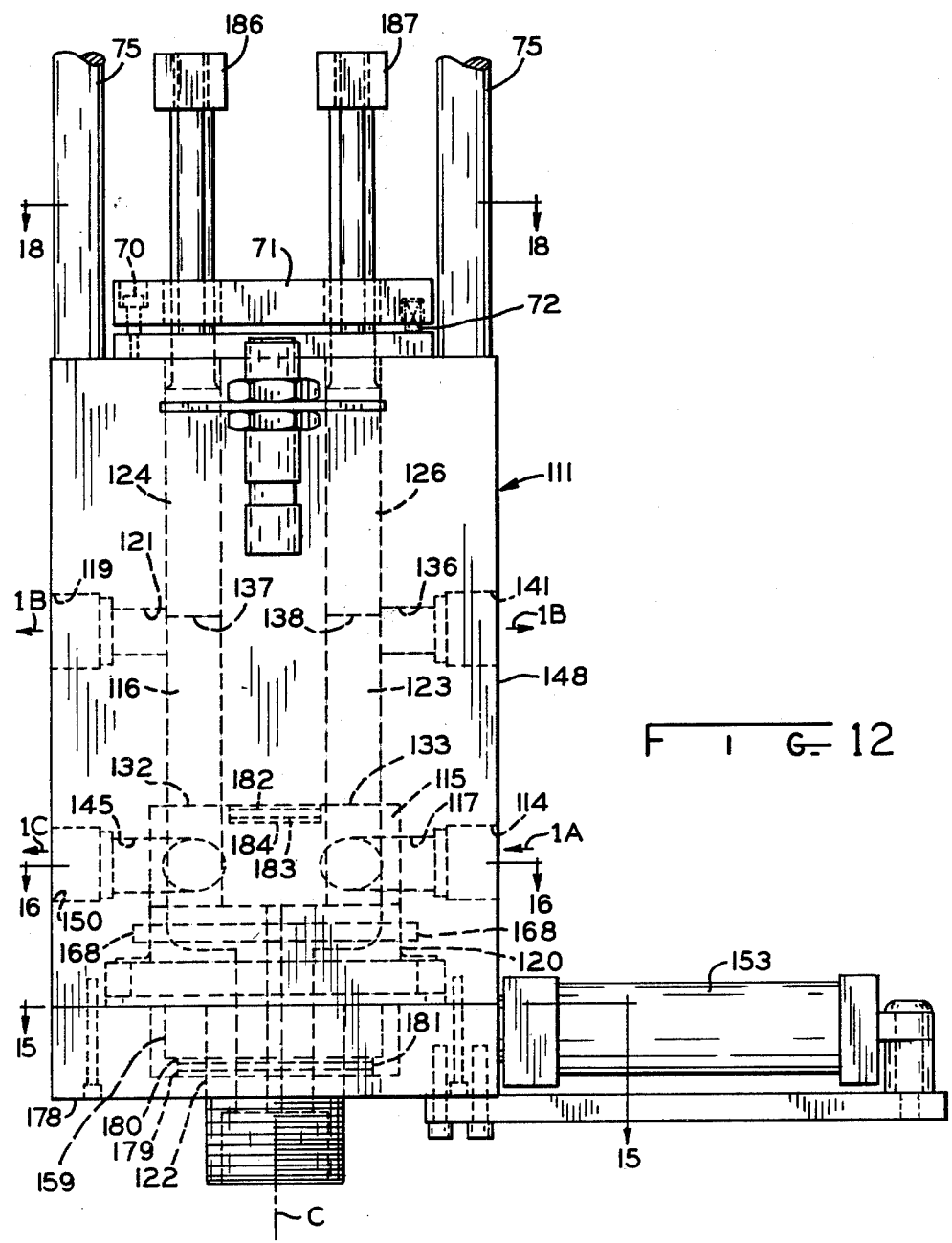
FIG. 12 is a front elevation, with parts broken away and parts removed, of apparatus embodying features of the invention in another form.
Figure 18:
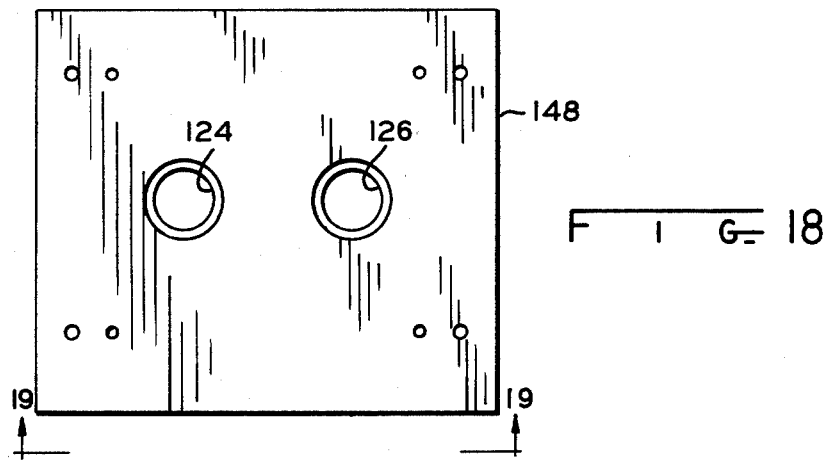
FIG. 18 is a plan view of the metering block when viewed in the direction of lines 18—18 in FIG. 1.

During operation of the apparatus, bearing lubricant material is metered in predetermined amounts to bearing lubricant reservoirs from the dispensing chambers 16, 23 (116, 123 in FIG. 12). At this point, it should be noted that two virtually identical dispensing chambers are shown in each of FIGS. 1 and 12, but that a single chamber or more than two chambers may be used while practicing the invention. The actual number of chambers to be used will depend on the relative maximum volumes of the chambers and the lubricant reservoirs to be filled, the complexity of the discharge path into the lubricant reservoirs and through nozzle means, and the user's choice.

Figure 24:
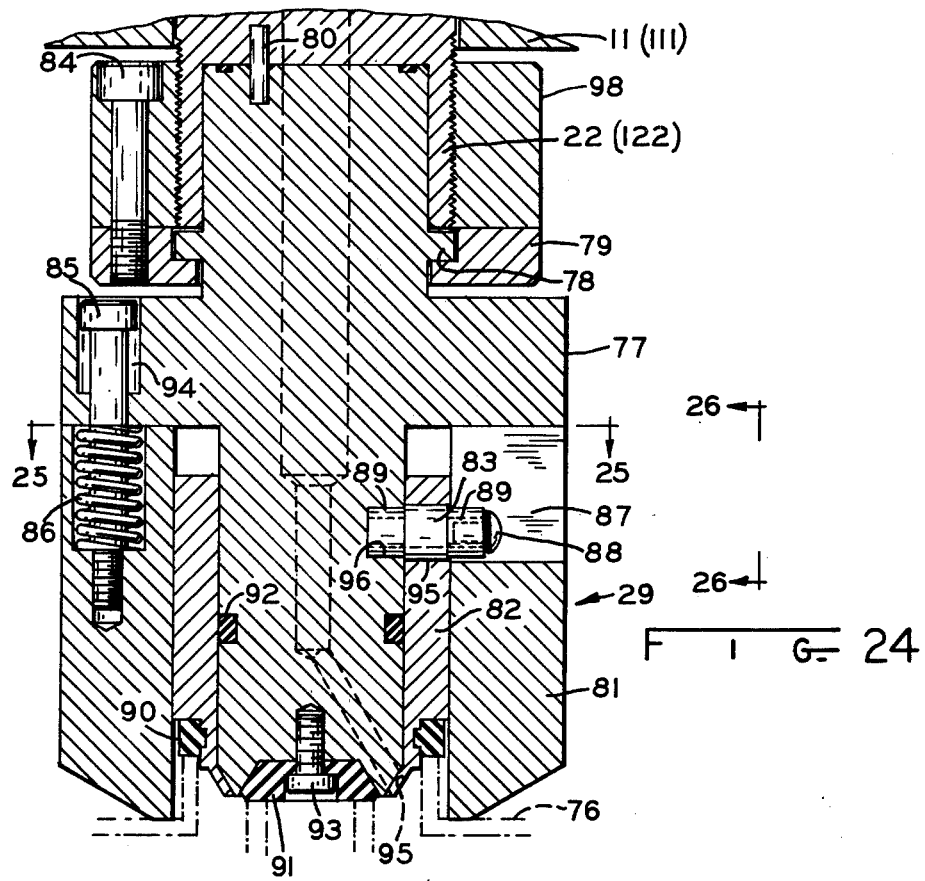
FIG. 24 is a front elevation, with parts in section and parts broken away, showing a valved discharge nozzle that may be used with the apparatus of FIGS. 1 or 12, with the view of FIG. 24 being taken in the direction of lines 24—24 in FIG. 25.
Figure 25:
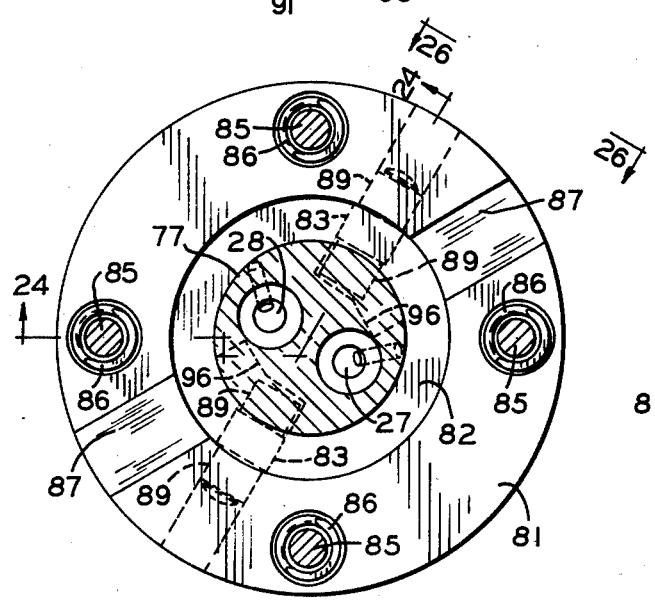
FIG. 25 is a view taken in the direction of lines 25—25 in FIG. 24.
Figure 26:
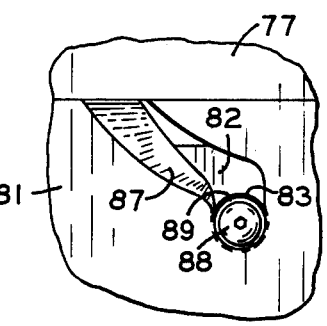
FIG. 26 is a view, with parts removed and parts broken away, taken in the direction of lines 26—26 in FIG. 25.

Still having reference to FIG. 1 (and FIG. 12) it will be noted that the chambers 16, 23 (116, 123) are elongate, and also cylindrical in shape (although a particular shape is not critical with regard to the inventive principles disclosed herein); and plunger means in the form of pistons 24, 26 (124, 126 in FIG. 12) movable axially within the chambers are operative to force lubricant material from the chambers along discharge paths 27, 28 defined by a discharge nozzle means which is illustrated as nozzle structure 29 in FIGS. 24-26. The nozzle 29 is fastened to apparatus 11 or apparatus 111 as best shown in FIG. 24.

The dispensing chambers 16, 23 (116, 123 in FIG. 12) have port means that are selectively connectable with the discharge nozzle means, or with a lubricant supply. In the illustrated embodiments, such port means comprise ports 33, 34 (132, 133 in FIG. 12) that are selectively connectable with the lubricant material source or supply, and with the nozzle 29. The selective connection of the port means with the discharge nozzle means and lubricant material supply is accomplished in the apparatus by valve means which include the body 22 (or composite body 122 in FIG. 12) as it is relatively rotated with respect to the chambers 16, 23 (116, 123 in FIG. 12).

Figure 3:
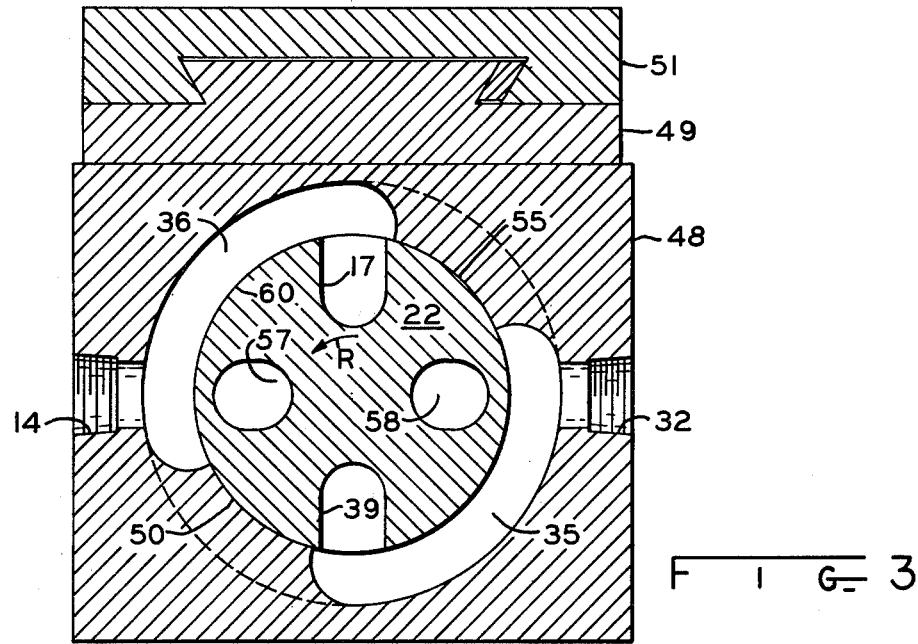
FIG. 3 is a view with parts removed, taken along section line 3—3 of FIG. 1.

With reference now only to FIGS. 1-11, when the valve means is in a selected position relative to the chambers 16, 23 such that the passageways 17, 39 are in open material transferring relationship with the supply and also the chambers 16, 23 (while the body 22 is rotated ninety degrees from its relative position as shown in FIG. 3); lubricant material is moved into the chambers 16, 23 by flowing (under pressure from the material supply) into cavities defined by the respective dispensing chambers 16, 23 and the plunger means (for example, faces 37, 38 of the pistons 24, 26). As the lubricant material flows into these cavities, the pistons move upwardly until the discharge passages 21, 36 are exposed. Thereafter, while lubricant material continues to be supplied, the lubricant material overflows through passageways 21, 36 and overflow outlets 19, 41. In FIG. 1, the pistons 24, 26 are illustrated in a first fixed axial position relative to the chambers 16, 23 such that the volume of the cavities under the piston faces 37, 38 is a maximum, and the lubricant material flowing into the cavities 16, 23 holds the pistons in the first position.

At the time that lubricant material is to be moved out of the cavities 16, 23 and into the discharge paths 27, 28 (see FIGS. 24, 25); the open material receiving relationship of the chambers 16, 23 and the material supply as changed to a closed relationship, and the flow of material into the chambers is interrupted. However, material may continue to be delivered through inlet ports 14, 32; and passages 17, 39 into bypass means (see phantom line passage 42 in FIG. 1, passages 42, 43, and common passage 40 and bypass port 45 in FIGS. 9-11), and thence to the material supply.

With reference now to FIGS. 12-23, when the valve means there shown is in a selected position relative to the chambers 116, 123 such that the passageway 117 is in open material transferring relationship with the supply and also the chambers 116, 123 (while the parts are in the relative position shown in FIG. 17); lubricant material is moved into the chambers by flowing (under pressure from the material supply) into cavities defined by the respective dispensing chambers 116, 123 and the plunger means (for example faces 137, 138 of the pistons 124, 126). As the lubricant material flows into these cavities, the pistons move upwardly until the discharge passages 121, 136 are exposed. Thereafter, while lubricant material continues to be supplied, the lubricant material overflows through passageways 121, 136 and overflow outlets 119, 141. In FIG. 12, the pistons 124, 126 are illustrated in a first axial position relative to the chambers 116, 123 such that the volume of the cavities under the piston faces 137, 138 is a maximum, and the lubricant material flowing into the cavities 116, 123 holds the pistons in the first position.

At the time that the lubricant material is to be moved out of the cavities 116, 123, and into the discharge paths 127, 128 (see FIGS. 24, 25); the open material receiving relationship of the chambers 116, 123 and the material supply is changed to a closed relationship, and the flow of material into the chambers is interrupted. However, material may continue to be delivered through the inlet port 114 and passage 117 into passage 140 (see FIG. 16) and thence through passage 145 and out of bypass port 150 and back to the supply. This bypass flow of material is indicated by arrow 1C in FIG. 12.

With collective reference to FIGS. 13-17, it will be understood that top disc 115 is rotatable forty-five degrees relative to the chambers 116, 123. In the relative position shown in FIG. 16, material bypasses the chambers 116, 123, and the chambers communicate with through holes 127, 128 and may discharge material therethrough. However, when top disc 122 is in the relative position shown in FIG. 17, material flowing into passage 140 exits through holes 129, 130 and into the chambers 116, 123 which are aligned therewith.

The pistons 24, 26 (124, 126 in FIG. 12) remain in the first relative axial position when the flow of material into chambers 16,23 (116, 123 in FIG. 12) is interrupted, and continue to remain in such position until an open material discharge path from the cavity is established for discharge of material from the nozzle means. By holding the pistons in the first position, pressure is not exerted by the pistons on the material in the cavity during the valving sequence just described. At the end of the valving sequence, the plunger means are moved downwardly along the chambers to decrease the cavity volumes and discharge lubricant material. At the end of the piston stroke, piston movement is arrested, and the pistons remain fixed at a bottom (or second) relative axial position while another valving sequence takes place which re-establishes the open material receiving relationship between the chambers and the material supply ports. By this time, of course, the discharge path will also have been closed. The pistons then move upwardly and increase the cavity volumes as lubricant material is once again supplied to the chambers.

The valving sequences mentioned above are accomplished without concomitant movement of the pistons. More specifically, relative movement of the rotary body-i.e., the rotary action valve means 22 (122 in FIG. 12) and metering block 48 (148 in FIG. 12) about a vertical axis (as viewed in FIG. 1 or 12, an axis generally through the center of the rotary body as shown by an axis line C) causes the chambers to be slectively connected to the material supply or discharge paths. The metering block of apparatus 11 or 111 is fastened to a vertical slide block 49 (see FIG. 2) and thus prevented from rotary movement relative to the machine frame 51. The metering blocks on the other hand rotatably support the bodies 22, 122; and relative rotary movement of the metering blocks and rotary bodies is accomplished by extending or retracting the rods 52, 152 of cylinders 53, 153 respectively and thereby rotating the metering block within body 22 (see FIGS. 4 and 15).

This relative rotation causes the previously discussed selective valving sequences. This may be better understood by now considering together FIGS. 1-11 for the apparatus 11.

Figure 4:
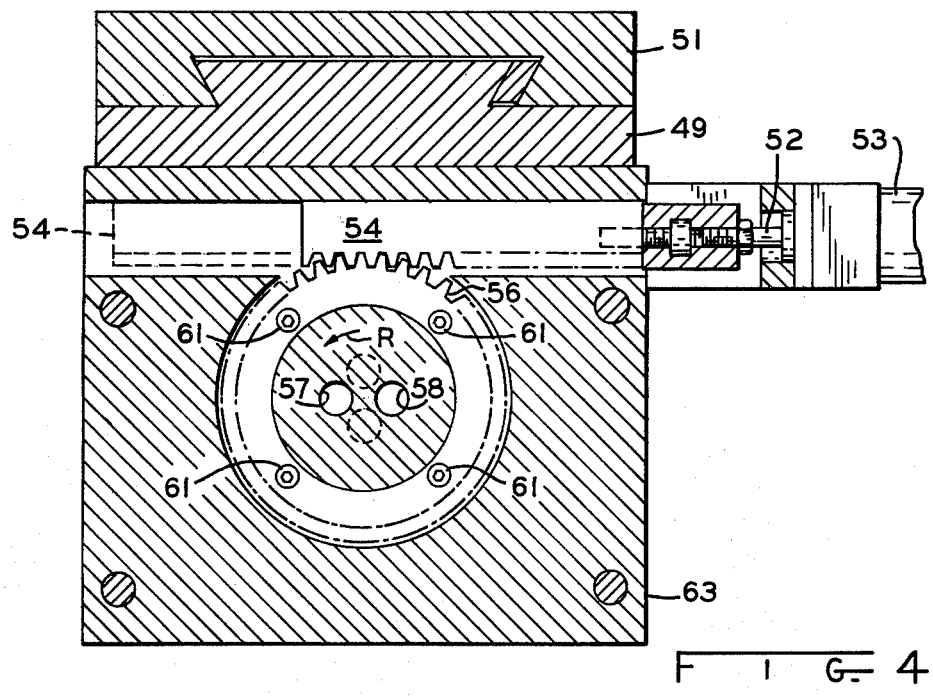
FIG. 4 is a view with parts removed, taken along section line 4—4 of FIG. 1.
Figure 7:
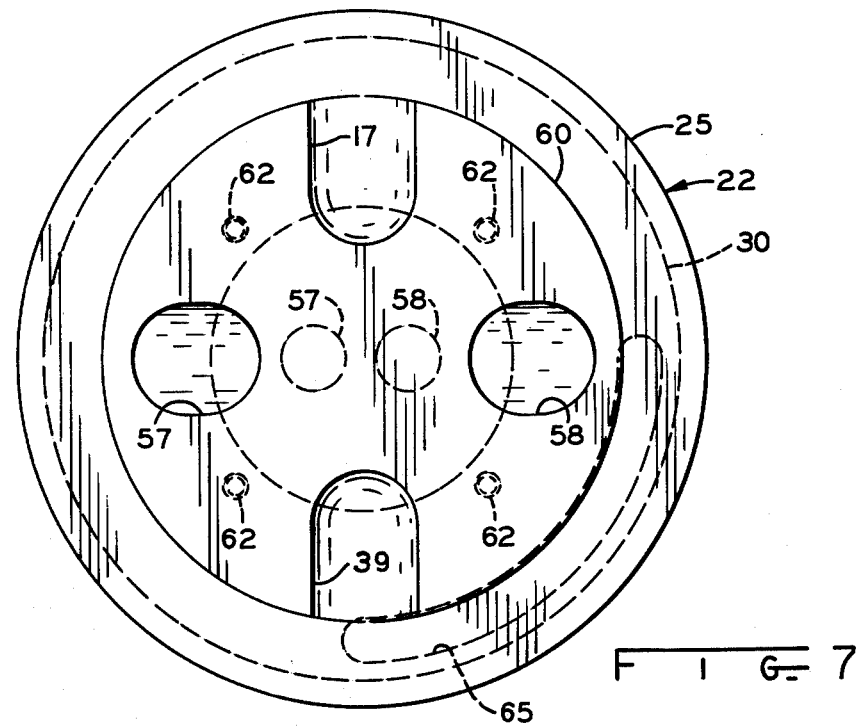
FIG. 7 is a view taken in the direction of lines 7—7 in FIG. 6.

The relative position of body 22 and block 48 in FIG. 1 is the same as that shown in FIGS. 3, 4, and 5, with the inlets 14, 32 in a closed condition relative to chambers 16, 23; and the chambers 16, 23 in open communication with discharge paths 57, 58. With this relative positioning of parts, the overflow outlets 19, 41 are open to the return path of material, although no material will be exiting outlets 19, 41 since material flow into the chambers 16, 23 is interrupted due to the relative position of rotary body 22. At this time, bypass passages 42 and 43 are "open" (also see FIG. 10), i.e., they are in material transferring communication with one or more material return conduits. Also at this time, and as will be discussed in more detail hereinbelow in connection with FIG. 4, a drive arm illustrated as rack 54, in engagement with pinion 56, is retracted as shown in FIG. 4.

As previously mentioned, with the parts in the relative positions shown in FIGS. 1, 3, and 5, the ports 33, 34 are in open material transferring communication with discharge paths 57, 58 which extend through body 22 and which also remain in open material transferring communication with discharge paths 27, 28 of the nozzle means of FIGS. 24, 25. In addition, bypass passages 40, 42, 43 (see FIG. 10) now inerconnect bypass port 45 directly with inlets 14, 32 via transfer passages 35, 36 and inlet passageways 17, 39. It should now be understood that relative rotation of metering block 48 and valve body 22 functions to selectively connect the transfer passages 35, 36 and inlet passages 17, 39 with the chamber ports 33, 34 or with the bypass passages 42, 43.

The valving action of the apparatus 11 is accomplished due to the interaction of rotary body 22 and block 48. As best shown in FIGS. 3 and 9–11, the block 48 has a circular bore 20 formed therein which accepts flange 25 (see FIG. 6) of body 22. The flange 25 is bifurcated at 30 to accept any suitable seal, such as a "Parker" O-Ring No. 2-347. The block 48 is also machined to establish partial bore defining surfaces 50, 55 which accommodate, with a sliding fit, cylindrical portion 60 of body 22. The block 48 is also machined between the surfaces 50 and 55 to form recessed regions that established the transfer passages 35, 36.

With reference now to FIG. 3, with body 22 and block 38 in the relative positions there shown, material entering ports 14 and 32 flows along transfer passages 35 and 36 and can escape only by flowing into inlet passageways 17, 39. Thereupon, the material is divered upwardly into (see FIGS. 10 and 11) bypass passages 42, 43. While the ports are in this same relative position, discharge paths 57, 58 are aligned with (see FIGS. 9 and 11) ports 33, 34 of chambers 16, 23.

To commence a chamber filling sequence, rotary body 22 is rotated ninety degrees in the direction of arrow R in FIG. 3, whereupon discharge paths 57 and 58 become aligned with bypass passages 42, 43; and inlet passages 17, 39 become aligned with ports 33, 34 (see FIGS. 9–11). While in this position, material admitted through inlets 14 and 32 (as viewed in FIG. 9) is diverted ninety degrees by passages 17, 19 and thus enters ports 33, 34 while flowing in a direction that is collinear with the longitudinal axis of chambers 16, 23. Then, after the rotary body 22 has been re-rotated ninety degrees in a sense opposite to that indicated by arrow "R", material is discharged from chambers 16, 23 in a collinear direction past ports 33, 34.

Figure 8:
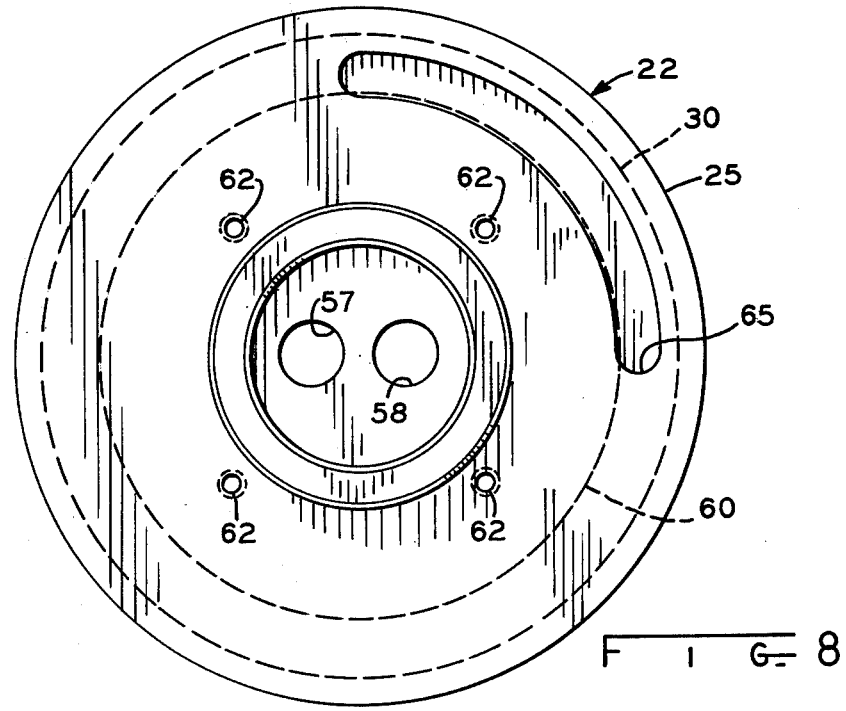
FIG. 8 is a view taken in the direction of lines 8—8 in FIG. 6.

Rotation of body 22 is effected by pinion 56 which is fastened thereto by any suitable means, such as illustrated by four screws or bolts 61 that thread into tapped holes 66 (see FIGS. 4 and 8). Rack 54 is then used to selectively rotate the pinion and rotary body, as previously discussed, and the rack and pinion thus constitute one form of means for effecting relative rotary movement of the block 48 and valving means.

With reference now to FIG. 1, it will be noted that the body 22 is held in place for relative rotation by means of a retainer 63 which is fastened, e.g., by bolts, to the bottom of block 48. In addition to serving a retaining function, it is desirable for retainer 63 to carry a dowel pin 64 which protrudes into a slot 65 (see FIGS. 7 and 8) of body 22. The interaction of this pin and slot then positively limits relative rotation of body 22 to ninety degrees. However, suitable stops for rack 54 or cylinder rod 52 (see FIG. 4) could be used to accomplish the same result.

Material is urged from the chambers through the outlets 33, 34 by forcing the pistons 24, 26 axially along the chambers 16, 23 and toward the dispensing outlets. This diminishes the chamber volumes and dispenses measured charges of material to a dynamoelectric machine end frame positioned under the apparatus. Upon completion of the dispensing step, the outlets 33, 34 are closed to incoming or metered material by relative rotation of the metering block and rotary body 22. This also closes the bypass passages 42, 43 to incoming material and connects the inlets 14, 32 with the chambers. Until this time, pistons 24, 26 remain in the "down" or second relative axial position, but introduction of material by way of the inlets 14, 32 now causes the pistons 24, 26 to rise and move away from the outlets 33, 34 and to rise until they open the overflow outlets 19, 41.

The pistons 24, 26 carry switch actuators 67, 68 at the upper end thereof, and rod 69 of a main drive cylinder drives the pistons downwardly by impinging on the top of the switch actuators. The actuators, in turn, preferably are used to trip limit switches or proximity switches to signal that both pistons are in an elevated or raised position.

After a valving sequence is performed to open the discharge ports of the chambers 16, 23; the rod 69 begins to drive the pistons 24, 26 downwardly. As the rod 69 reaches the end of its downward stroke, the switch actuators 67, 68 bear against an actuator plate 71, and force the plate 71 downwardly until plate 71 rests on the top of block 48. This downward movement of plate 71 compresses four springs 72, and also actuates a limit switch 73 which signals that the plungers or pistons 24, 26 have reached the bottom dwell position thereof. At this time, the main rod 69 dwells at its lower position until the valving sequence is performed to condition the chambers for being refilled once again. Thereupon, the rod 69 retracts, permitting the plungers 24, 26 to rise under the influence of the compressed spring 72 and the material entering the chambers 16, 23. The springs 72 expand only a small amount (e.g., in the neighborhood of two centimeters), until the actuator plate 71 is limited from further movement by the heads of four retaining bolts 70. The use of springs 72 provides an additional power assist (by reason of the energy stored therein) in overcoming friction and initiating upward movement of the plungers 24, 26. Thereafter, the incoming material exerts sufficient pressure on pistons 24, 26 to assure that they rise to the uppermost position thereof. Since the plungers 24, 26 are accommodated in oversized holes 74 in actuator plate 71, the plate itself does not contribute to friction on the plungers 24, 26; and springs 72 therefor only need to be sufficiently stiff to overcome the friction between plungers 24, 26 and the interior surfaces of chambers 16, 23.

Material is simultaneously urged from the chambers 16, 23 when pistons 24, 26 descend together under the force exerted by rod 69. When the chambers 16, 23 are of the same diameter, equal charges are dispensed therefrom.

With known prior art devices discussed hereinabove, the procedure followed is to close an overflow outlet, substantially compress the measured quantity of material, and then close the inlet to the dispensing chamber. In contradistinction, rotation of the block 48 in the apparatus 11 substantially simultaneously closes the inlet and overflow outlets and virtually at the same time opens the dispensing or discharge outlet without movement of a compression piston so that the valving occurs without increasing the pressure on the compressible lubricating material due to the valving action itself. This procedure, without an increase in pressure, is referred to herein as an isobaric process.

The illustrated apparatus 11 includes the previously noted frame (which includes a dovetail block 51 supporting the metering head for vertical movement, and suspension rods 51 which control the vertical position of the metering head under the influence of a not shown cylinder), and a metering head 92 which includes, inter alia, the body 22 and metering block 48. When the head 48 is mated with an end shield, a not shown limit switch is actuated and provides a signal that the dispensing head is in its "down" position. This signal is then used to enable cylinder 53 to cause a valving sequence, and injection will occur after a suitable time delay or upon actuation of a proximity or limit switch by the rack 54 or rod 52.

After cylinder 53 causes the valving sequence, rod 69 is extended, material is dispensed, and limit switch 74 is tripped. Thereupon, rod 69 rises and cylinder 53 retracts to cause another valving sequence, with material then refilling chambers 16, 23 as above described. Although specific sequences of steps have now been described, it should be understood that overlapping steps in actual practice may occur.

By following the above description while reviewing FIGS. 12-23, it is believed that the mode of operation and valving sequences of the apparatus 111 will be self-evident to persons skilled in the art. However, in order to assure completeness of the present disclosure, salient features of the apparatus 111 will now be described with reference to FIGS. 12-23.

At the outset, it is again noted that top disc 115 (see FIGS. 13 and 14) and lower section 120 (see FIGS. 21-23) are secured together to form the composite rotary body 122. Although any suitable means may be utilized to hold these parts together, we have utilized four not shown socket head screws that were accommodated in countersunk holes 154 in top disc 115, and threaded into tapped holes 156 in lower section 122. When the disc 115 and lower section 120 are fastened together, the discharge paths 127, 128 (see FIG. 13) will overlie, respectively, discharge paths 157, 158 in lower section 120 (see FIGS. 21-23).

The relative position of composite rotary body 122 and block 148 in FIG. 12 is the same as that shown in FIG. 16, with the inlet 114 in a closed condition relative to chambers 116, 123; and the chambers 116, 123 in open communication with discharge paths 127, 128 and 157, 158. With this relative positioning of parts, the overflow outlets 119, 141 (see FIG. 12) are open to the return path of material, although no material will be exiting outlets 114, 141 since material flow into the chambers 116, 123 is interrupted due to the relative position of rotary body 122. In the relative position shown in FIG. 16, bypass passage 145 is "open", i.e., it is in material transferring communication with a not shown material return conduit connected to bypass port 150. Also at this time, and as will be discussed in more detail hereinbelow in connection with FIG. 15, a drive arm 159 is retracted as shown in FIG. 15. The arm 159 is secured to the bottom surface 163 (see FIG. 21) by means of four screws 161 that are threaded into tapped holes 162.

With the parts in the relative positions shown in FIGS. 12, 16, and 15, the ports 133, 134 of chambers 116, 123 are in open material transferring communication with passages 127, 128 and discharge paths 157, 158 which extend through body 122 and which also remain in open material transferring communication with discharge paths 27, 28 of the nozzle means of FIGS. 24, 25. In addition, passage 140 now interconnects inlet 114 directly with bypass port 150, and holes 129, 130 are blocked by interior suface 163 of block 148 (see FIGS. 19 and 20). Subsequent relative rotation of metering block 148 and body 122 functions to selectively connect the passage 140 (via holes 129, 130) with the chambers 116, 123, to block passages 127, 128 with surface 163, and to block passage 145 as shown in FIG. 17.

Figures 19, 20:
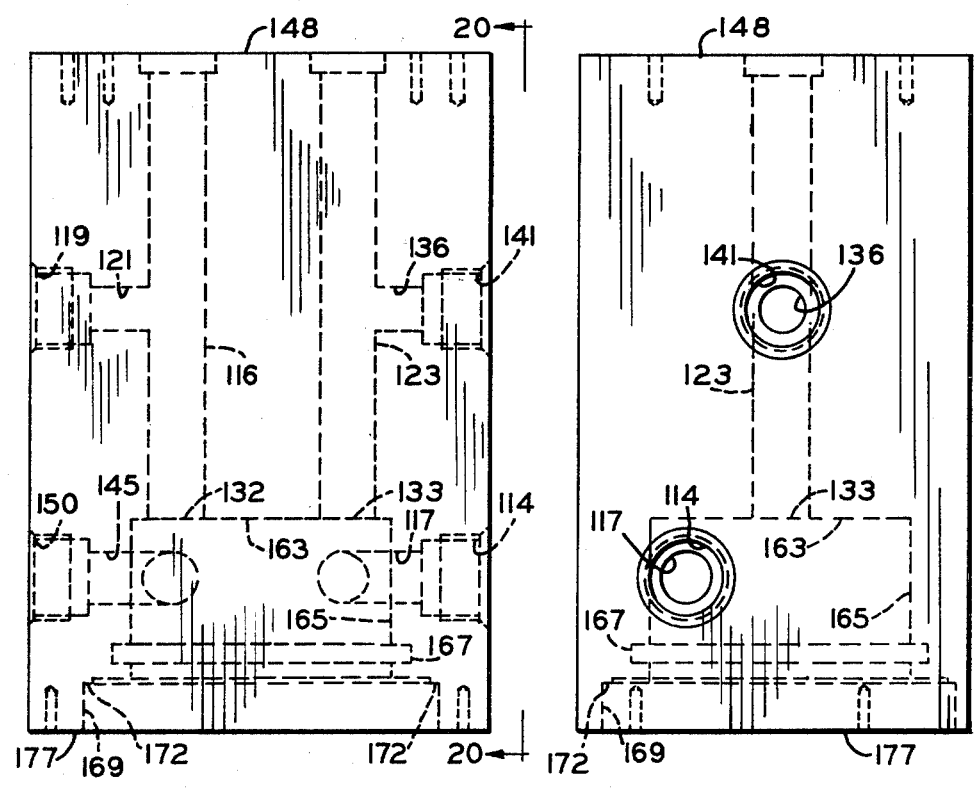
FIG. 19 is a view taken in the direction of lines 19—19 in FIG. 18.
FIG. 20 is a view taken in the direction of lines 20—20 in FIG. 19.

The valving action of the apparatus 111 is accomplished due to the interaction of rotary body 122 and block 148. As best shown in FIGS. 12, 19, and 20, the block 148 has a circular bore 165 formed therein which accommodates top disc 115 and a portion of cylindrical portion 166 of lower section 120 (see FIGS. 21, 22). Block 148 is also machined to establish a cylindrical seal 167 for a not shown lip seal. In one actual reduction to practice, we made the bore 165 88.9 mm (3.5 inches), and seat 167 101.6 mm (4.0 inches) in diameter by 7.14 mm long (0.281 inches) to accept a Parker ;#84-0075-4 N301-8 (nitrile) lip seal 168 (see FIG. 12) that would bear against surface 166 after the parts were assembled. Still another bore 169 is formed in block 148 with a diameter of 120.66 mm (4.7502 inches) and a length of 15.88 mm (0.625 inches) to accommodate ball bearing 171 (see FIG. 12) which was a Kaydon #JU040XPO. The ball bearing then was pressed on surface 176 and trapped between surface 172 and lip 173 (see FIG. 21) of body section 120. After assembly, lower surface 174 (see FIG. 21) of section 120 is flush with surface 177 of block 148; and held in place by a retainer 178 which is best illustrated in FIG. 12. The retainer 178 is bolted to block 148, and in an actual reduction to practice, the retainer accommodated a purchased Torrington thrust bearing plate #TRC-3244, denoted by numeral 179, and a Torrington thrust bearing plate #TRA-3244, and a Torrington thrust bearing #NTA-3244 denoted respectively by the numerals 180, 181.

To commence a chamber filling sequence, rotary body 122 is rotated forty-five degrees so that holes 129, 130 become aligned with ports 132, 133 of chambers 116, 123. While in this position, material admitted through inlet 114 (as viewed in FIG. 17) is diverted ninety degrees from passage 140 and thus enters ports 132, 133 while flowing in a direction that is collinear with the longitudinal axis of chambers 116, 123. Then, after the rotary body 122 has been re-rotated forty-five degrees to the position shown in FIG. 16, material is discharged from chambers 116, 123 in a collinear direction past ports 132, 133.

With reference now to FIG. 12, it is noted that the body 122 is held in place for relative rotation, and a Torrington thrust bearing NTA-1220 (element 182) and a Torrington thrust plate TRB-1220 is trapped in a recess 184 in top disc 115 in order to reduce frictional resistance to rotation of the assembly 122.

Material is urged from the chambers 116, 123 through the outlets 132, 133 by forcing the pistons 124, 126 axially along the chambers 116, 123 and toward the dispensing outlets. This diminishes the chamber volumes and dispenses measured charges of material to a dynamoelectric machine end frame positioned under the apparatus. Upon completion of the dispensing step, the outlets 132, 133 are closed to incoming or metered material by relative rotation of the metering block and rotary body 122. This also closes the bypass port 150 to incoming material and connects the inlet 114 with the chambers. Until this time, pistons 124, 126 remain in the "down" or second relative axial position, but introduction of material by way of the inlet 114 now causes the pistons 124, 126 to rise and move away from the ports 132, 133 and to rise until they open the overflow outlets 119, 141.

The pistons 124, 126 carry switch actuators 186, 187 at the upper end thereof, and the rod 69 of the main drive cylinder (shown in FIG. 1) drives the pistons downwardly by impinging on the top of the switch actuators. The actuators, in turn, preferably are used to trip limit switches or proximity switches to signal that both pistons are in an elevated or raised position.

After a valving sequence is performed to open the discharge ports of the chambers 116, 123; the rod 69 begins to drive the pistons 124, 126 downwardly. As the rod 69 reaches the end of its downward stroke, the switch actuators 186, 187 bear against the actuator plate 71, and force the plate 71 downwardly until plate 71 rests on the top of block 148. This downward movement of plate 71 compresses four springs 72, and also actuates a proximity switch 188 which signals that the plungers or pistons 124, 126 have reached the bottom dwell position thereof. At this time, the main rod 69 dwells at its lower position until the valving sequence is performed to condition the chambers for being refilled once again. Thereupon, the rod 69 retracts, permitting the plungers 124, 126 to rise under the influence of the compressed springs 72 and the material entering the chambers 116, 123. The springs 72 expend as described hereinbove, and the actuator plate 71 is limited from undue movement by the heads of the four retaining bolts 70.

Material is simultaneously urged from the chambers 116, 123 when pistons 124, 126 descend together under the force exerted by rod 69. When the chambers 16, 23 are of the same diameter, equal charges are dispensed therefrom.

The illustrated apparatus 111 includes the previously noted frame (which includes a dovetail block 51 supporting the metering head for vertical movement, and suspension rods 75 which control the vertical position of the metering head under the influence of a not shown cylinder), and the metering head which includes, inter alia, the body 122 and metering block 148. When the nozzle means is mated with an end shield, a not shown limit switch is actuated and provides a signal that the dispensing nozzle is in its "down" position. This signal is then used to enable cylinder 153 to cause a valving sequence, and injection will occur after a suitable time delay or upon actuation of a proximity or limit switch by the rod 152 or arm 154.

After cylinder 153 causes the valving sequence; rod 69 is extended, material is dispensed, and proximity switch 188 is tripped. Thereupon, rod 69 rises and cylinder 153 retracts to cause another valving sequence, with material then refilling chambers 116, 123 as above described. Although specific sequences of steps have now been described, it should be understood that overlapping steps in actual practice may occur.

The nozzle structure 29 depicted in FIGS. 24–26 will now be described in more detail. Initially, it is noted that the nozzle structure shown in FIG. 9 may be utilized with the apparatus 11 or the apparatus 111 and that the nozzle structure 29 may be threaded onto the threaded depending portion of the rotary body 22 or the rotary body 122. The nozzle 29 is constructed so that the material dispensing passages which dispense material into an end frame 76 (see FIG. 24) may be positively closed with a shearing action so as to prevent material from seaping or dripping from the nozzle.

The nozzle means of FIG. 24 includes a nozzle body 77 having a flanged portion 78 thereof held fast to the lower end of a rotary body 22 (122) by means of a retainer nut 98 and retainer ring 79. It will also be noted that a dowel pin 80 is utilized to insure that dual discharge paths 27, 28 are in proper alignment and registry with the material transferring passages in the rotary body to which the nozzle means is attached. To disassemble the nozzle body 77 from the rotary body 22 (122), it is only necessary to rotate the retainer nut so as to unthread it from the rotary body. Since the retainer ring and retainer nut, when loosened, will permit relative rotation between the nozzle body 77 and the retainer nut and retainer ring, unscrewing the retainer nut from the rotary body 22 will result in removal of the nozzle body 77 from the structure 11 (or 111 as the case may be). Assembly of the nozzle body 77 to the apparatus 11 is accomplished by simply reversing the procedure just described.

The nozzle structure 29 also includes a cam ring 81, a control ring 82, a cam shaft 83, six socket head cap screws 84, four shoulder screws 85, and four springs 86. The cam shaft 83 is a cylindrical structure having a cam lobe 96 which rides in the cam track 87, with the cam shaft being bored at one end thereof in order to retain a retaining rivet 88. A Torrington needle bearing number B-34, denoted by the reference numeral 89, is carried on each end of the cam shaft, and the bearing itself functions as a cam lobe.

The nozzle structure 29 also includes rubber (or any other suitable elastomeric material) seals 90, 91 which bear against an end frame during a lubricant injection subcycle and prevent leakage of lubricant material therefrom. In addition, an O-ring 92, such as a Parker O-ring #2-214 is utilized to prevent leakage of material upwardly along relatively movable parts as they relatively move as will be described hereinbelow. Finally, it will be noted that any suitable fastener, such as the screw 93 may be utilized to secure the sealing structure, such as the seal 91 to the nozzle body.

During operation of the apparatus 11 (or 111 as the case may be) the nozzle structure 29 will be moved to its lowermost position with the parts thereof assuming the positions as illustrated in solid lines in FIGS. 24–26. At this time, the springs 86 are compressed and the heads of screws 85 have risen in their retaining holes 94 as illustrated. In addition, the cam ring 81 (into which the screws 83 are threaded) is in its uppermost position relative to the nozzle body 77 and the round needle bearing cam lobe 96 will be in the bottom of the cam track 86 as illustrated in FIG. 26. With the parts in this relative position, material transferring passages 95 in the control ring 82 will be aligned with the discharge paths 27, 28 formed in the nozzle body 77; and material may be discharged into the end frame 76. At the end of a dispensing sub-cycle, the rotary body 22 (or 122 as the case may be) will be raised away from the end frame 76. Then, as the nozzle body 77 moves upwardly, springs 86 will expand and cause relative movement between cam ring 99 and nozzle body 77. This relative movement is limited to movement in the axial direction only, because the screws 85 prevent relative rotation from occuring between the cam ring and nozzle body. When the nozzle body 77 has been elevated to its uppermost position, the heads of the screws 85 will bear against the bottom of the screw accommodating holes 94, and the cam ring 81 will have elevated to a point sufficiently far above the end frame 76 to permit removal of the end frame 76 from underneath the nozzle structure 29.

During the time that relative axial movement is occuring between the cam ring and the nozzle body 77, relative rotary movement will take place between the control ring 82 and the nozzle body 77. This occurs because the cam 83 is press fit into a hole 95 in the control ring 82, but is free to move laterally in slots 96 formed in the nozzle body 77. Thus, as the nozzle body 77 moves upwardly relative to the cam ring 81, the cam shaft 83 is forced to move upwardly in the cam track 87. However, since the cam ring 81 is not permitted to rotate relative to the nozzle body 77, the cam is constrained to follow the cam track 87 and move laterally relative to the nozzle body 77. As the cam undertakes such lateral movement, it forces the control ring 82 to move in a rotary fashion relative to the nozzle body 77. As the control ring moves in this manner, the discharge paths 27, 28, are blocked by the control ring and any material extending from the discharge paths 27, 28 into the end frame 76 is sheared by the control ring as it rotates relative to the nozzle body.

In view of all of the foregoing, it should now be apparent that novel processes and apparatus for dispensing compressible lubricating materials have been disclosed meeting the objects and advantageous features set out hereinabove. Moreover, it should be apparent that modifications as to precise configurations, shapes, details, precise steps of the preferred methods or order in which such steps are performed, may be made by those having ordinary skill in the art without departing from the spirit of the invention.

What we claim as new and desire to secure by Letters Patent of the United States is:

1. A method of metering predetermined quantities of a bearing lubricant material into at least one bearing lubricant reservoir from at least one dispensing chamber that is of an elongate configuration and that has axially movable plunger means therein for forcing quantities of the lubricant material therefrom; the method comprising:

moving lubricant material into the at least one dispensing chamber through a passageway that is in open material receiving relationship with a source of lubricant material and the at least one dispensing chamber and moving the material through a given port into the at least one dispensing chamber until a quantity of the lubricant material fills a cavity defined by the at least one dispensing chamber and the plunger means with the plunger means in a first axial position relative to the at least one dispensing chamber; changing the open material receiving relationship of the at least one dispensing chamber and the source of material to a closed relationship and thereby interrupting the flow of lubricant material through the given port into the at least one dispensing chamber while the plunger means is maintained in a fixed axial position relative to the at least one dispensing chamber, and establishing an open discharge path for lubricant material through the same given port from the cavity to the at least one bearing lubricant reservoir; relatively moving the plunger means axially with respect to the at least one dispensing chamber so as to reduce the volume of the cavity and thereby force lubricant material out of the same given port and along the open discharge path and into the lubricant reservoir; arresting relative axial movement of the plunger means and at least one dispensing chamber, and closing the discharge path for lubricant material out of the same given port and from the at least one dispensing chamber while such relative axial movement remains arrested; thereafter re-establishing the open material receiving relationship of the at least one dispensing chamber through the same given port and with the source of material; and moving lubricant material through the same given port and into the at least one dispensing chamber, and relatively moving the plunger means axially with respect to the at least one dispensing chamber so as to increase the volume of the cavity.

2. The method of claim 1 wherein the material is moved solely along a given substantially linear path substantially lacking in curvature from the time that it enters the given port and while it moves into the cavity.

3. The method of claim 2 wherein the material is moved solely along the same given substantially linear path substantially lacking in curvature from the time that the plunger starts forcing material out of the given port at least until the material passes the given port.

4. The method of claim 1 wherein the discharge path for lubricant material is defined by a structural body, and the method further comprises changing the open material receiving relationship of the at least one dispensing chamber and the source of material to a closed relationship and establishing an open discharge path for lubricant material, and closing the discharge path for lubricant material comprises relatively rotating the at least one chamber and the structural body; and wherein the structural body is closely mateable in material transferring relationship with a lubricant reservoir while lubricant material is forced out of the same given port, and material discharged from the discharge path into the lubricant reservoir is subjected to a rotary wiping action while the relative axial movement of the plunger means is arrested.

5. A method of forcing predetermined amounts of a bearing lubricant into at least one bearing lubricant reservoir from at least one axially extending dispensing chamber having port means selectively connectable with a discharge nozzle and a lubricant supply source and having plunger means axially movable therein for forcing quantities of lubricant therefrom; the method comprising: flowing lubricant into the at least one dispensing chamber through a given port at an axial end thereof while the given port is in open material transferring communication with a lubricant source, until a quantity of the lubricant material fills a cavity defined by the at least one dispensing chamber and the plunger means with the plunger means located in a first position relative to the at least one dispensing chamber; blocking further flow of lubricant into the at least one dispensing chamber and estalbishing an open discharge path from the at least one dispensing chamber through the same given port to the lubricant reservoir without moving the plunger means relative to the dispensing chamber; reducing the volume of the cavity and forcing lubricant through the same given port and along the open discharge path and into the lubricant reservoir; closing the discharge path without moving the plunger means relative to the dispensing chamber; re-establishing open material transferring communication between the same given port of the at least one dispensing chamber and lubricant source, and flowing lubricant through the same given port into the at least one dispensing chamber while increasing the volume of the cavity.

6. A method of metering predetermined quantities of a bearing lubricant material into at least one bearing lubricant reservoir from at least one dispensing chamber that is of an elongate configuration and that has axially movable plunger means therein for forcing quantities of the lubricant material therefrom; the method comprising:

moving lubricant material into the at least one dispensing chamber through a passageway and a chamber port that underlies the plunger means in collinear relation thereto and that is in open material receiving relationship with a source of lubricant material and the at least one dispensing chamber until a quantity of the lubricant material fills a cavity defined by the at least one dispensing chamber and the plunger means, with the plunger means in a first axial position relative to the at least one dispensing chamber; changing the open material receiving relationship of the at least one dispensing chamber and the source of material to a closed relationship and thereby interrupting the flow of said lubricant material into the at least one dispensing chamber without exerting pressure on the lubricant material within the cavity with the plunger means, and establishing an open discharge path for lubricant material through the same chamber port and from the cavity to the at least one bearing lubricant reservoir; relatively moving the plunger means axially with respect to the at least one dispensing chamber so as to reduce the volume of the cavity and thereby force lubricant material through the same chamber port and along the open discharge path and into the lubricant reservoir; arresting relative axial movement of the plunger means and at least one dispensing chamber, and closing the discharge path for lubricant material from the at least one dispensing chamber while such relative axial movement remains arrested; thereafter re-establishing the open material receiving relationship of the at least one dispensing chamber through the same chamber port with the source of material; and moving lubricant material into the at least one dispensing chamber through the same chamber port, and relatively moving the plunger means axially with respect to the at least one dispensing chamber so as to increase the volume of the cavity by forcing material through the same chamber port in a direction that is substantially collinear with the line of movement of the plunger means.

7. A method of forcing predetermined amounts of a bearing lubricant material into a bearing lubricant reservoir from at least one dispensing chamber having port means comprising a port located at an end of the chamber selectively connectable with discharge nozzle means or a lubricant supply and also having movable plunger means therein for forcing quantities of lubricant material therefrom; the method comprising: utilizing the port as an entry port and moving lubricant material into the at least one dispensing chamber through the entry port from a lubricant material supply until a quantity of the lubricant material fills a cavity defined by the at least one dispensing chamber and the plunger means, and until the plunger means is located in a first position relative to the at least one dispensing chamber; converting the entry port to a discharge port and thereby disconnecting the port means from the lubricant material supply, thereby interrupting the flow of lubricant material into the at least one dispensing chamber while the plunger means remains in the same first position, and thereby also connecting the cavity through the discharge port with the nozzle means so as to establish an open discharge path for lubricant material from the end of the cavity through the nozzle means; reducing the volume of the cavity and forcing lubricant material out of the cavity and along the open discharge path; maintaining the reduced volume of the cavity substantially constant while reconverting the discharge port to an entry port and thereby disconnecting the port means from the nozzle means and closing the discharge path, and thereby also reconnecting the port means and lubricant material supply; and moving lubricant material into the at least one dispensing chamber while increasing the volume of the cavity.

8. Apparatus for repetitively dispensing consistent quantities of a compressible lubricant material to dynamoelectric machine bearing lubricant reservoirs, said apparatus including at least one material inlet port and at least one material discharge passage, a metering head having at least one axially extending chamber therein with an opening at an end thereof, plunger means axially movable relative to the metering head and along the at least one chamber, and rotary means for selectively interconnecting the at least one chamber with the at least one material inlet port and with the at least one material discharge passage; said rotary means being effective to admit material into the opening at the bottom of said chamber and also to permit material to be discharged from said chamber through the same opening.

9. The apparatus of claim 8 wherein the rotary means is operative to divert flowing compressible lubricant material from a first path of travel to a second path of travel generally collinear with the direction of movement of the plunger means.

10. The apparatus of claim 8 wherein the metering head includes at least two metering chambers, and the rotary means includes means for causing lubricant material to flow both into and out of the chambers in directions collinear with the movement of plunger means arranged for movement axially within each of the chambers.

11. The apparatus of claim 8 wherein nozzle means are interconnected with the metering head, and auxiliary closure means carried by the nozzle means selectively block material flow from the nozzle means.

12. The apparatus of claim 8 wherein discharge means depend from the metering device and movement of the rotary means for changing the material flow paths in the metering device is also effective for establishing a wiping action between the discharge means and a dynamoelectric machine lubricant reservoir definging structure.

* * * * *